(12) United States Patent
Hill et al.

(10) Patent No.: US 11,352,984 B2
(45) Date of Patent: Jun. 7, 2022

(54) VALVE FOR CONTROLLING A PRESSURE DIFFERENTIAL

(71) Applicant: PLASTIC OMNIUM ADVANCED INNOVATION AND RESEARCH, Brussels (BE)

(72) Inventors: David Hill, Brussels (BE); Antonin Rohr, Brussels (BE); Jean-Marc Toussaint, Brussels (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 0 days.

(21) Appl. No.: 17/282,882

(22) PCT Filed: Oct. 25, 2019

(86) PCT No.: PCT/EP2019/079304
§ 371 (c)(1),
(2) Date: Apr. 5, 2021

(87) PCT Pub. No.: WO2020/084156
PCT Pub. Date: Apr. 30, 2020

(65) Prior Publication Data
US 2021/0348582 A1    Nov. 11, 2021

(30) Foreign Application Priority Data

Oct. 26, 2018  (EP) .................................... 18202974

(51) Int. Cl.
*F02M 25/08*       (2006.01)
*B60K 15/035*      (2006.01)
(Continued)

(52) U.S. Cl.
CPC ... *F02M 25/0836* (2013.01); *B60K 15/03519* (2013.01); *F16K 1/44* (2013.01);
(Continued)

(58) Field of Classification Search
CPC ........ F02M 25/0836; F02M 2025/0845; F16K 1/44; F16K 1/54; F16K 39/024
See application file for complete search history.

(56) References Cited

U.S. PATENT DOCUMENTS 4,782,862 A  * 11/1988  Nguyen .............. F16K 31/0693
                                                      137/630.14
6,553,975 B2    4/2003   Weldon et al.
(Continued)

FOREIGN PATENT DOCUMENTS

CN         103827563 A      5/2014
CN         104975994 A     10/2015

OTHER PUBLICATIONS

International Search Report dated Jan. 14, 2020 in PCT/EP2019/079304 filed Oct. 25, 2019, 4 pages.

*Primary Examiner* — Eric Keasel
(74) *Attorney, Agent, or Firm* — Oblon, McClelland, Maier & Neustadt, L.L.P.

(57) ABSTRACT

A valve, controlling pressure differential by regulating fluid flow between a tank and a canister, includes: a valve opening; a first moving element carrying a first sealing device making a leaktight seal and movable relative to the valve opening between a closed and an opened position allowing a first flow between the tank and the canister, through a first passageway with a first size; a second moving element carrying a second sealing device making a leaktight seal and movable relative to the valve opening between a closed and an opened position allowing a second flow between the tank and the canister, through a second passageway with a second size. The second moving element includes a central hole having a frustoconical surface partly defining the first passageway. The first sealing device has a (Continued)

complementary frustoconical surface cooperating with the frustoconical surface of the central hole of the second moving element.

11 Claims, 6 Drawing Sheets

(51) Int. Cl.
    *F16K 1/44*           (2006.01)
    *F16K 1/52*           (2006.01)
    *F16K 1/54*           (2006.01)
    *F16K 39/02*          (2006.01)

(52) U.S. Cl.
    CPC ................. *F16K 1/52* (2013.01); *F16K 1/54* (2013.01); *F16K 39/024* (2013.01); *F02M 2025/0845* (2013.01)

(56) References Cited

U.S. PATENT DOCUMENTS

| | | | |
|---|---|---|---|
| 6,612,338 B2 * | 9/2003 | Weldon | F16K 1/44 137/529 |
| 6,729,351 B2 * | 5/2004 | Bircann | F16K 1/443 123/568.2 |
| 2010/0269921 A1 | 10/2010 | Pifer et al. | |
| 2012/0255639 A1 | 10/2012 | Onodera et al. | |
| 2014/0020663 A1 | 1/2014 | Pifer et al. | |
| 2015/0068498 A1 | 3/2015 | Peters et al. | |

* cited by examiner

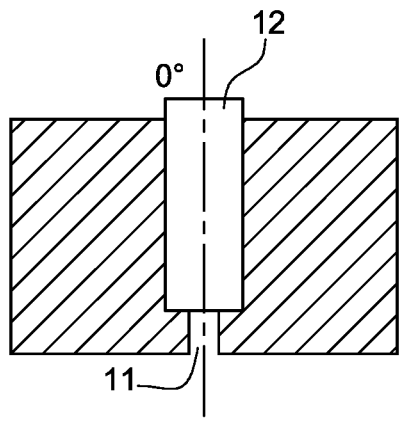
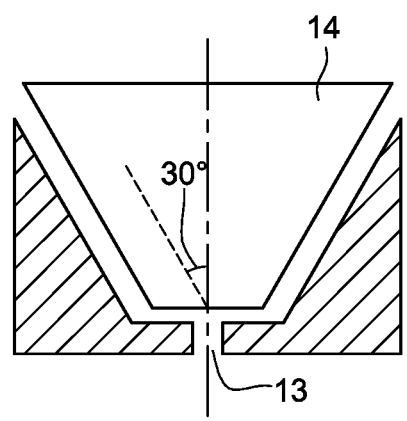
Fig. 10a  Fig. 10b
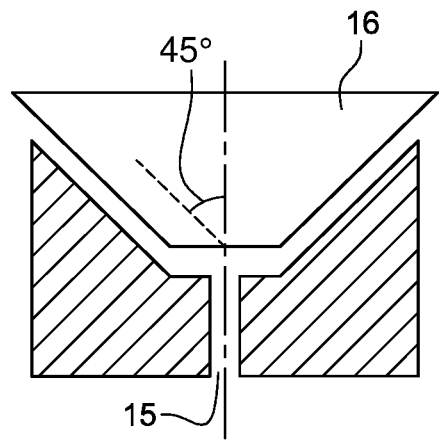
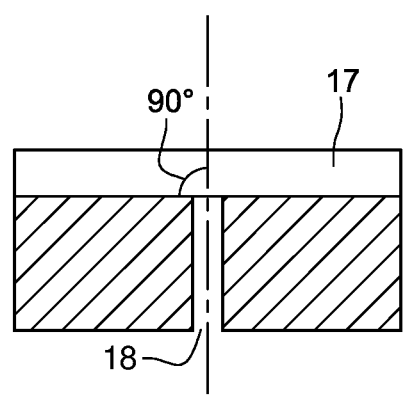
Fig. 10c  Fig. 10d
Fig. 11
Cross Sectional Flow Area vs. Opening Height
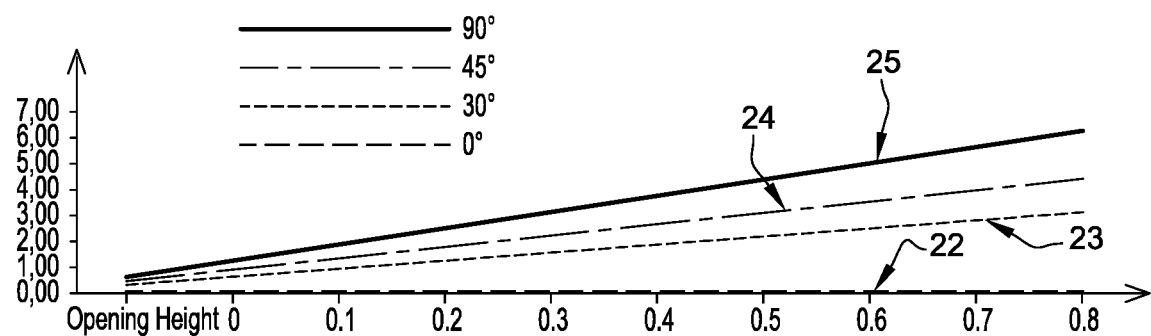

VALVE FOR CONTROLLING A PRESSURE DIFFERENTIAL

The invention relates to a valve for controlling fluid between two chambers and to method of controlling such a valve. Particularly, the invention relates to a proportional control valve for controlling fluid communication between a fuel tank and a canister in a vehicle. More generally, the invention relates to the field of conventional vehicles and hybrid vehicles.

It is known to use a valve, usually an electro-valve, to control fluid communication between the fuel tank and an inlet of a canister, and specifically to block the entrance of vapor in the canister. The difficulty is that since the vapor is under high pressure, sudden opening of the valve delivers a high quantity of vapor with a high flow rate, making it difficult to control the flow and leading to risks of further corking in the fuel system. To avoid this, it is known to use two combined valves in order to perform two specific functions on the fuel system, one providing a large venting path for the purpose of depressurizing the fuel tank with quick opening and high flow, and the other providing a smaller venting path capable of precisely controlling the flow through said orifice. For example, the document US2015068498 discloses a system for a vehicle comprising a tank pressure control valve coupled in a first conduit between a fuel tank and a fuel vapour canister, a refuelling valve coupled in a second, different, conduit between the fuel tank and the fuel vapor canister, the second conduit being in parallel to the first conduit, and the two separated valves achieving the two flow profiles respectively in order to avoid the corking problem. This configuration requires controlling means for each of the valves, thus this kind of fuel system needs space and is quite expensive.

A tank pressure control valve comprising a first moving element comprising an inner O-ring seal and a second moving element presenting a substantially plane surface is also known, for example from the document U.S. Pat. No. 6,553,975. The inner O-ring seal cooperates with the plane surface to define a first passage way when the first moving element is in the opened position, the first passageway being smaller than a second passageway which is defined by the second moving element in its opened position. However, when a sealing means opens normal to the plane of a sealing surface, it defines a passageway having a flow rate directly proportional to both the circumference of the passageway and the distance of the sealing means from said sealing surface. Thus, it is difficult to make a good resolution of the flow and the precision of control is not optimal.

The object of the invention is to provide a valve system with two different flow profiles, which means two shapes of opening, more compact and with a control of the flow which is more accurate.

It is accordingly an object of the invention to provide a valve for controlling a pressure differential by regulating the fluid flow between a fuel tank and a canister, comprising:
- a valve opening,
- a first moving element carrying a first sealing means for making a leak tight seal, the first moving element being movable relative to the valve opening between a closed position and an opened position allowing a first flow between the fuel tank and the canister, through a first passageway with a first size,
- a second moving element, distinct from the first moving element, carrying a second sealing means for making a leak tight seal, the second moving element being movable relative to the valve opening between a closed position and an opened position allowing a second flow between the fuel tank and the canister, through a second passageway with a second size, different from the first size,
- the first and second moving elements being configured to be actuated by a common actuator, wherein:
- the second moving element comprises a central hole having a frustoconical surface partly defining the first passageway, and
- the first sealing means has a complementary frustoconical surface configured to cooperate with the frustoconical surface of the central hole of the second moving element to make a leak tight seal.

In other words, a single valve in the system is provided, with a common actuator to actuate both the first and second moving elements. Thus, the valve is capable of achieving two different flow resolutions, which means two different precision levels, the system requiring less components. The system is therefore more compact and less expensive. Moreover, the flow is advantageously deflected by the conical shape, which makes a better resolution of the flow and more precision of control. As explained above, when a sealing means opens normal to the plane of a sealing surface, the flow rate changes very quickly by changing the distance between the sealing means and the sealing surface which makes the control of the flow very difficult. Conversely, if the sealing means and the sealing surface are parallel to each other then, changing the distance between the sealing means and the sealing surface will not change the flow rate. Advantageously, a frustoconical surface allows to further take advantage of a proportional control valve according to the invention by improving the flow resolution relative to the valve opening height thanks to a linear actuator, for instance a step actuator that rotates a lead screw coupled with a screw thread formed in a nut member for translating the rotation of the lead screw into linear travel of the sealing means in order to fine adjust the position of the sealing means with respect to the sealing surface.

It is to be noted that the valve is usually a proportional control valve, which is to say that its opening is controlled in a proportional way. This valve is preferably an electro-valve, but could be any other kind of valve.

It is also to be noted that "actuated by a common actuator" is usually to be understood as "actuated by a common motor shaft".

The actuator may be a step actuator, comprising a stepper motor, or else a simple DC motor (converting direct current electrical energy into mechanical energy) combined with an encoder or a position sensor.

Preferably, the first size of the first passageway is smaller than the second size of the second passageway.

The term "fuel tank" is understood to mean an impermeable tank that can store fuel under divers and varied environmental and usage condition. An example of this tank is that with which motor vehicle is equipped.

The term "corking" is understood to define what happens when the force of the rushing fuel vapor physically lifts the float of the valve against the seat, thereby blocking free vapor exit.

The valve may further comprise one or more of the following features, taken alone or in combination.

The actuator comprises a shaft having an axis (A) and the first and second moving elements are disposed coaxially on the axis (A). This is a very efficient way to use a common actuator to actuate both moving elements. It is advantageous to provide a better balance of the components during their movement and to reduce required space.

The first moving element is mounted permanently fixed to the actuator, and the second moving element is mounted movable on the actuator, such that it can take at least two positions relative to the actuator, and thus relative to the first moving element. This allows the first moving element to be opened independently from the second moving element.

The actuator comprises an abutment configured to cooperate with the second moving element such that the second moving element, once in contact with the abutment, moves together with the actuator. This allows to move the second moving element, and thus to open the second passageway, only once it is in contact with the abutment.

The valve comprises a biasing means configured to provide axial force on the second moving element to ensure the second sealing means remains sealed during the movement of the first moving element. Use of a such biasing means allows to make only the first passageway be opened during the movement of the first moving element.

The second moving element at least partly defines both the first passageway and the second passageway. More precisely:

the second moving element comprises a through-hole at least partly defining the first passageway when the first moving element is in the opened position, and the second sealing means cooperates with the valve opening to define the second passageway when the second moving element is on the opened position. This is a particularly compact configuration of the valve.

A biasing means is arranged between the first and second moving elements.

It is also an object of the invention to provide a fuel system comprising a fuel tank, a filler pipe for adding liquid fuel, a carbon canister for collecting fuel vapours from the fuel tank during a refuelling operation and a valve as previously described.

It is also an object of the invention to provide a vehicle comprising a fuel system previously described.

It is furthermore an object of the invention to provide a method of controlling a valve previously described comprising the following steps:

receiving a flow request from an engine controller via a serial communication, if a low rate of flow is requested, translating the actuator within a non-zero first axial travel range in order to move the first moving element relative to the second moving element, if a high rate of flow is requested, translating the actuator within a non-zero second axial travel range which is bigger than the first axial travel range, in order to move both the first moving element and the second moving element if none flow is requested, keeping the actuator on a position wherein the valve is sealed shut.

SHORT DESCRIPTION OF THE DRAWINGS

The following description shows some features of the valve. This description is based on figures, in which.

Figure 1:
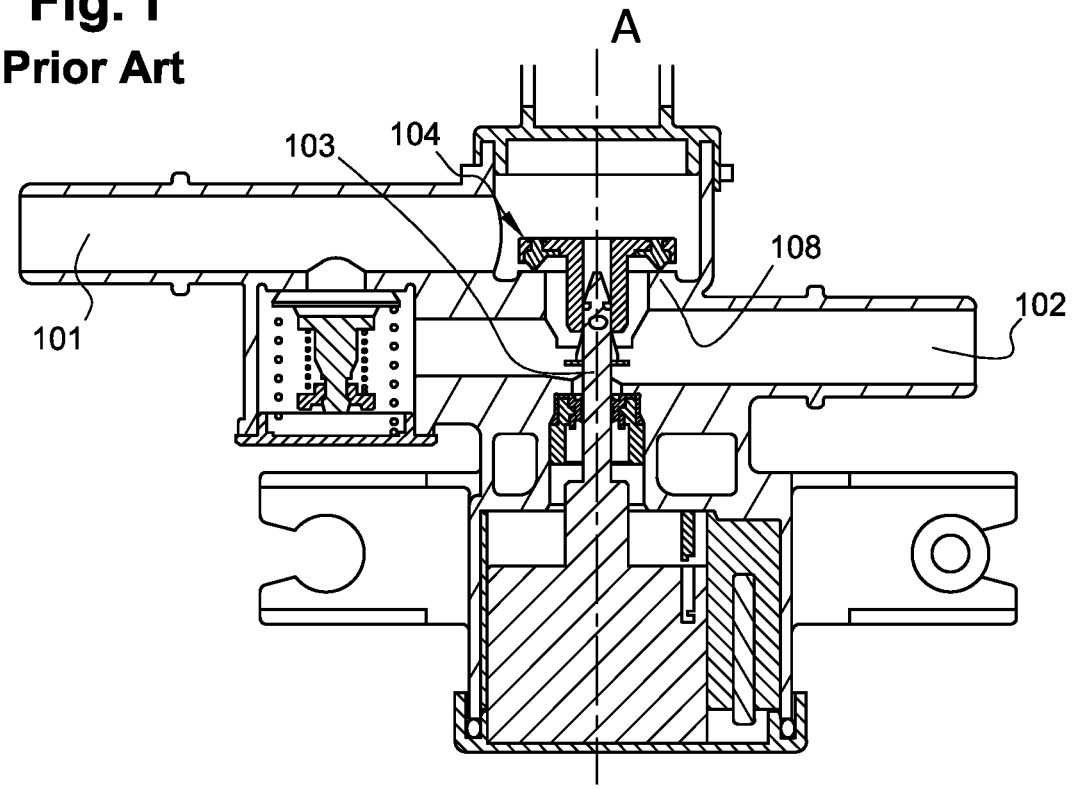
FIG. 1 is a longitudinal cut-away view illustrating a first known fluid controlling system.

FIG. 10*a*-10*d* are cross sections illustrating four different second moving elements shown in opened and closed positions;

FIG. 11 is a diagram illustrating the flow lines relative to the opening height shown on FIG. 10*a*-10*d*.

DESCRIPTION OF ILLUSTRATIVE EMBODIMENTS

The present invention will be described with respect to particular embodiments and with reference to certain drawings but the invention is not limited thereto but only by the claims. The drawing described are only schematic and are non-limiting. In the drawings, the size of some of the elements may be exaggerated and not drawn on scale for illustrative purpose. The dimensions and the relative dimensions do not correspond to actual reductions to practice of the invention.

Furthermore, the terms upper, lower, first, second and the like in the description and in the claims, are used for distinguishing between similar element and not necessarily for describing a sequence, either temporally, spatially, in ranking or in any other manner. It is to be understood that the terms so used are interchangeable under appropriated circumstances and that the embodiments of the invention described herein are capable of operation in other sequences than described or illustrated herein.

Figure 8:
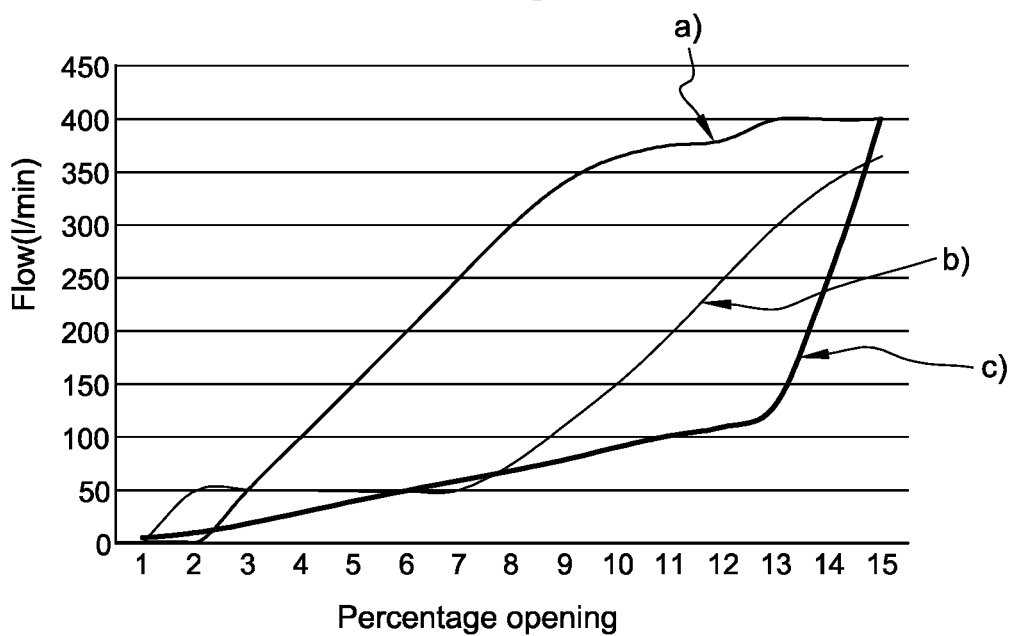
FIG. 8 is a diagram illustrating the flow curves relative to the percentage of opening in a fluid controlling system according to respectively a first known prior art, a second known prior art and the invention.

FIG. 1 illustrates a fluid control system according to a first known fluid controlling system. It comprises a valve with an inlet port 101 and an outlet port 102, a motor shaft 103 driving a poppet 104, or moving element, to open and close a valve opening 108 by an axial seal. The opening which is limited by the poppet and the valve opening defines an area wherein the fluid passes from the inlet port 101 to the outlet port 102. Since the area is only defined by the opening height and circumference of the area, the resolution of the flow control of the valve is very limited. As illustrated in FIG. 8, the flow which is represented by the curve a) increases very quickly from the very beginning of the valve opening which may lead to risks of corking in the fuel system.

Figure 2:
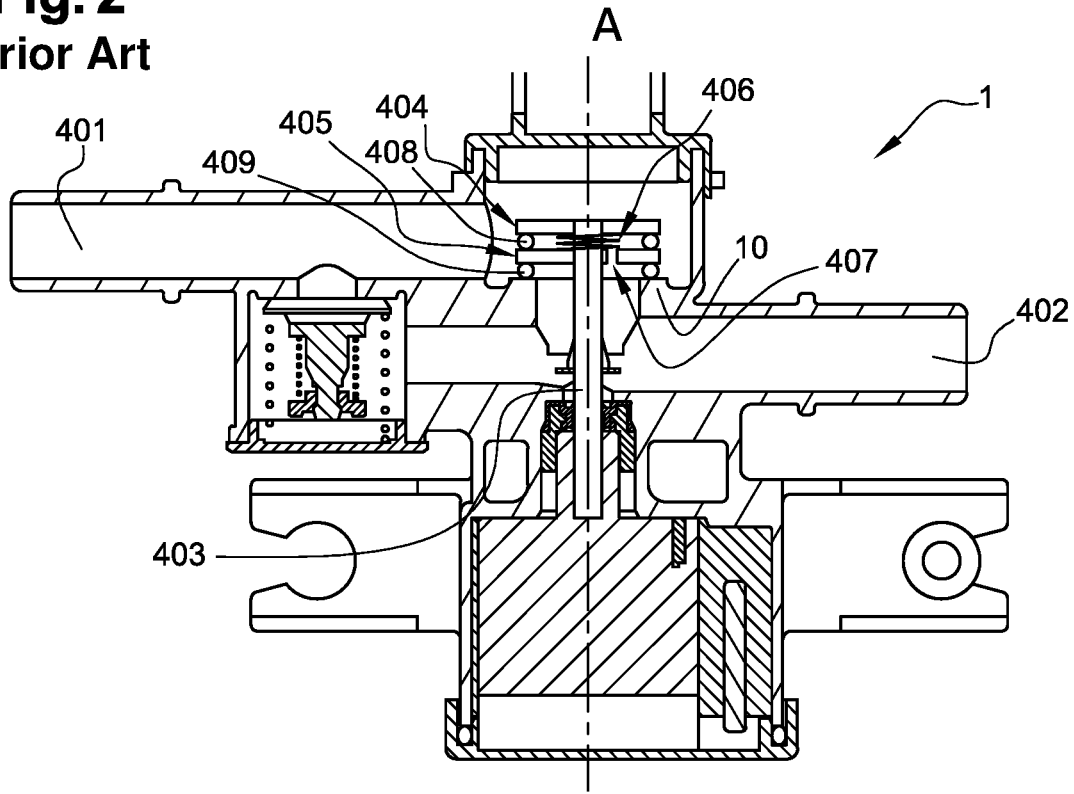
FIGS. 2, 3 and 4 are longitudinal cut-away views of a second known fluid controlling system using a valve in different positions.
Figure 3:
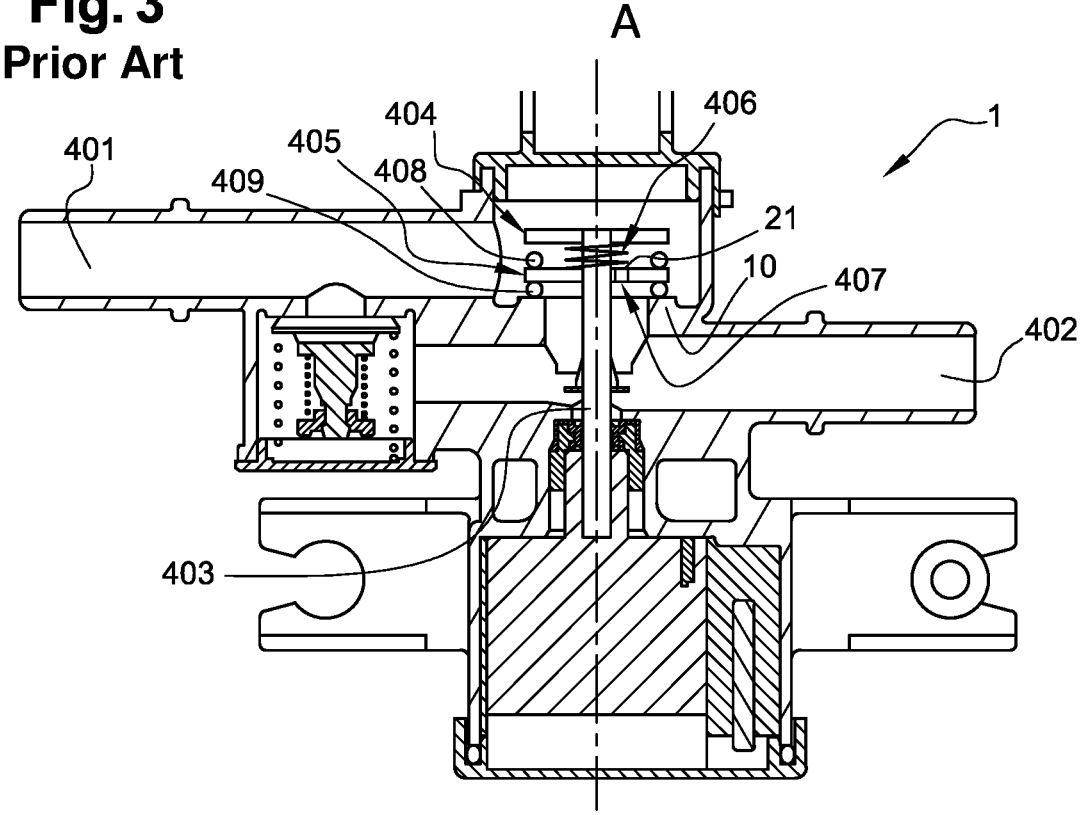
Figure 4:
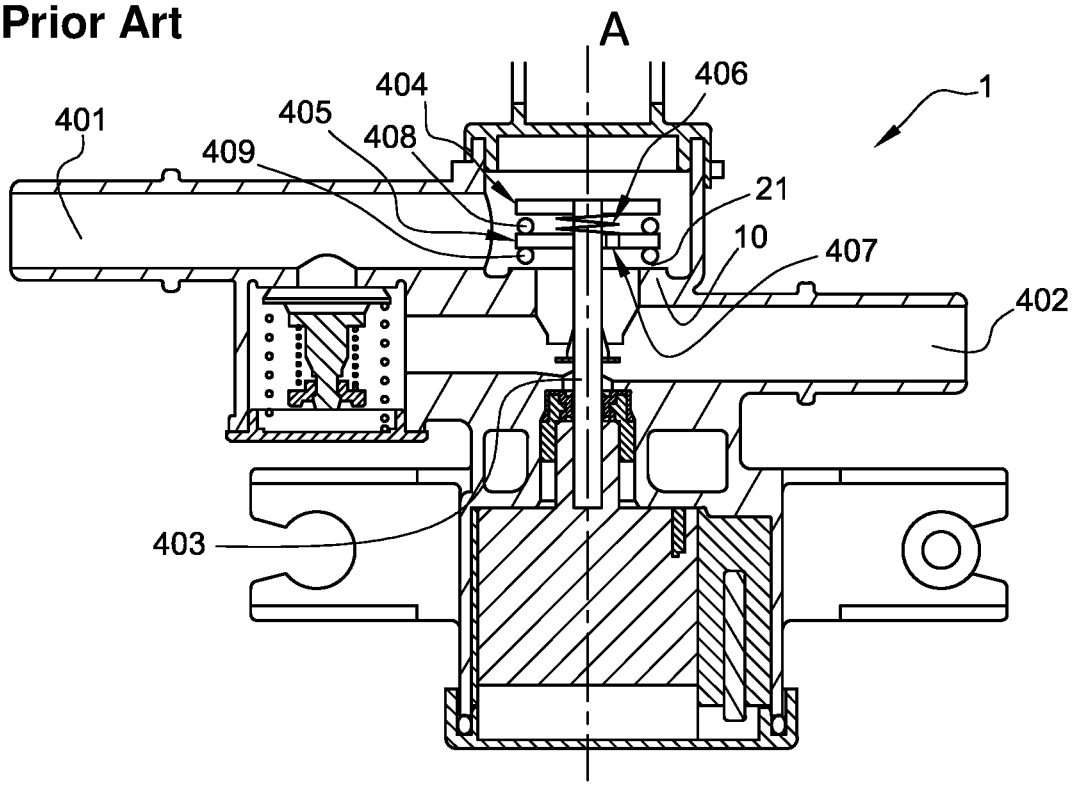

FIGS. 2, 3 and 4 disclose a second known fluid controlling system using a valve comprising an inlet port 401, an outlet port 402, a valve opening 10 and a motor shaft 403 having an axis (A). The motor shaft 403 is configured to be driven by a motor as previously described. The motor shaft 403 together with the motor form an actuator. The valve comprises furthermore a first moving element 404 which is mounted permanently fixed to the motor shaft 403 carrying a first sealing means 408 for making a leak tight seal with a second moving element 405. The second moving element 405 has a second sealing means 409 for making a leak tight seal with the valve opening 10. As in the first embodiment, the second sealing element 409 is axial sealing element, for example an O-ring seal 409 configured to be compressed between the second moving element 405 and the valve opening 10 for making a leak tight seal of the valve opening 10. Besides, the second sealing element 409 has an inner O-ring seal 408 arrange on the surface opposite to the axial sealing element.

As shown in the FIGS. 2, 3 and 4, the second moving element 405 is a panel-like piece comprising an eccentric hole 407. The first moving element 404 is also a panel-like piece and presents a substantially plane surface facing to the second moving element 405. The plane surface forms the first sealing means 408 and is configured to cooperate with the inner O-ring seal 408 of the second moving element 405 to make a leak tight seal of the valve opening 10 when the O-ring seal 409 is compressed.

The first moving element 404 is fixed axially and radially to the motor shaft 403 to move together with the motor shaft 403. The second moving element 405 is mounted movable on the same motor shaft 403, such that it can take at least two positions relative to the motor shaft 403. To this end, the motor shaft 403 comprises an abutment configured to cooperate with the second moving element 405 such that the second moving element 405, once in contact with the abutment, moves together with the motor shaft 403. The first moving element 404 and the second 405 moving elements are disposed coaxially on the axis (A).

The valve 1 comprises a biasing means 406 which can be a compression spring 406 in the described embodiment. According to the second embodiment, the compression spring 406 is arranged between the first moving element 404 and the second moving element 405 to provide axial force on the second moving element 405 to ensure the second sealing means 409 remains sealed during the movement of the first moving element 404.

FIG. 2 illustrates a fully retracted position wherein the valve opening 10 is closed by both of the first movement element 404 and the second moving element 405. The second moving element 405 is maintained on a closed position by the force of the compression spring 406. The first moving element 404 is also on a closed position because the motor shaft 403 is on its lowest position.

FIG. 3 illustrates an opened position of the first moving element 404 wherein the first moving element 404 has moved together with the motor shaft 403 axially to allow a first flow between the fuel tank and the canister, through a first passageway 21 with a first size. The first passageway 21 is defined by the eccentric hole 407 of the second moving element 405. The second moving element 405 is still maintained on a closed position by the force of the compression spring 406.

FIG. 4 illustrates an opened position of the second moving element 405 wherein the second moving element 405 is in contact with the abutment on the motor shaft 403 which moves the second moving element 405 together with the motor shaft 403 axially to allow a second flow between the fuel tank and the canister, through a second passageway 31 with a second size, bigger than the first size. The second passageway 31 is defined by the space between the second sealing means 409 and the valve opening 10.

Figure 5:
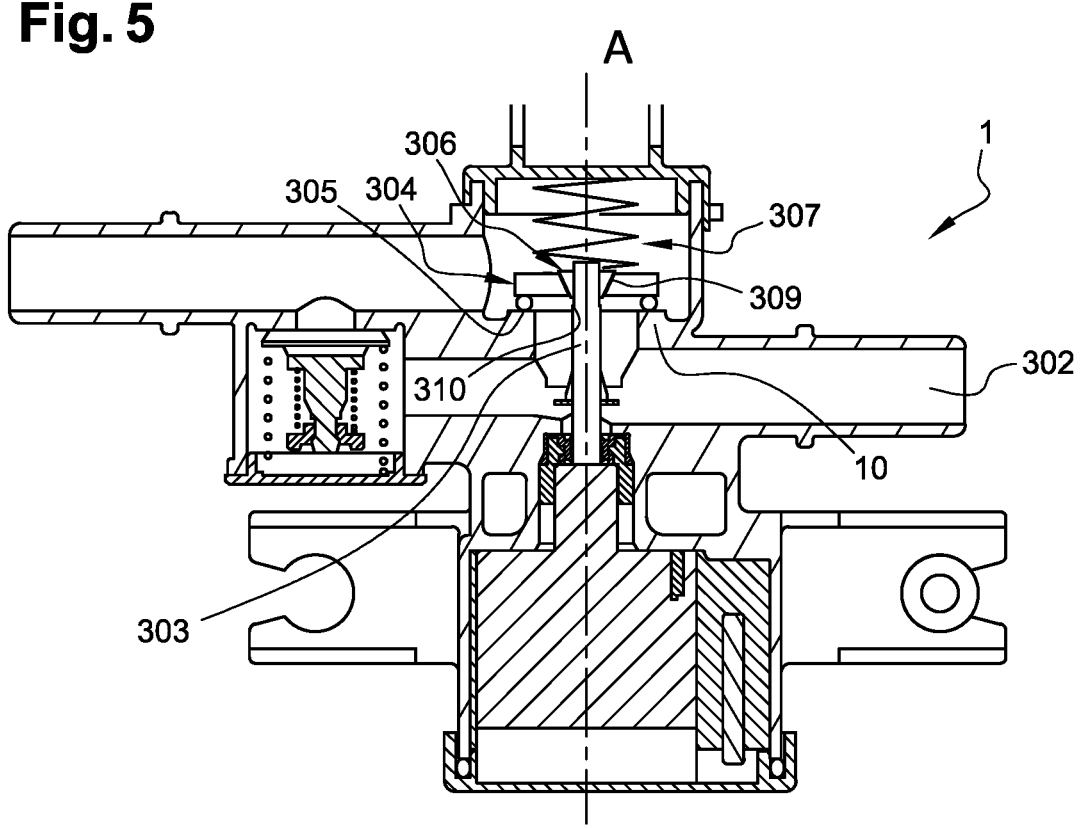
FIGS. 5, 6 and 7 are longitudinal cut-away views of a fluid controlling system using a valve in different positions according to an embodiment of the invention.
Figure 6:
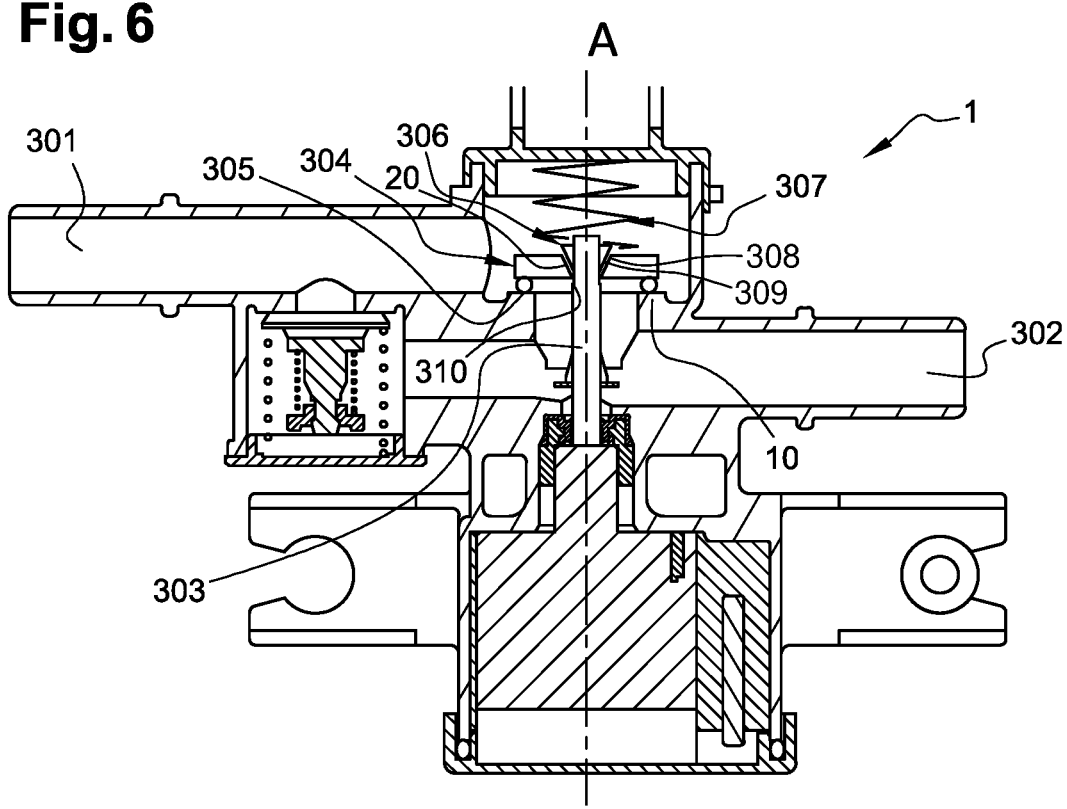
Figure 7:
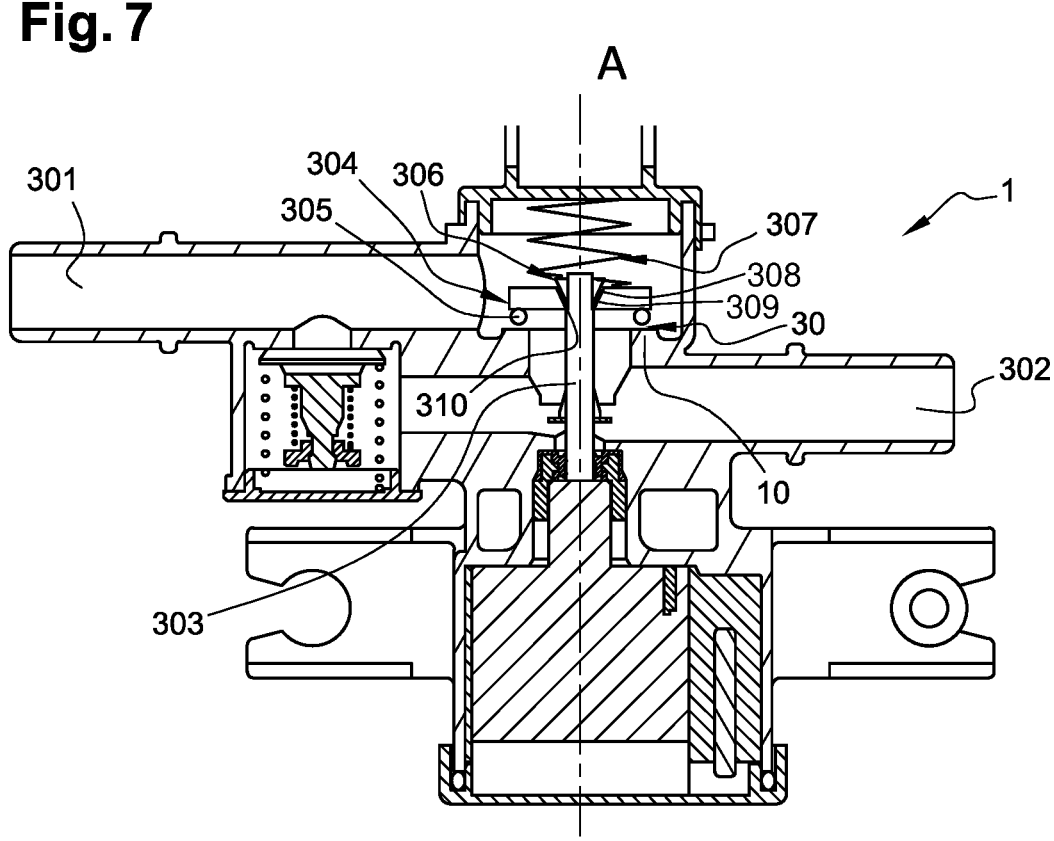

An embodiment of the invention is illustrated in FIGS. 5, 6 and 7. According to the invention, the valve comprises an inlet port 301, an outlet port 302, a valve opening 10 and a motor shaft 303 having an axis (A). The motor shaft 303 is configured to be driven by a motor. The motor shaft 303 together with the motor form an actuator. The valve comprises furthermore a first moving element 306 which is mounted permanently fixed to the motor shaft 303, carrying a first sealing means 309 for making a leak tight seal with a second moving element 304. The second moving element 304 has a second sealing means 305 for making a leak tight seal with the valve opening 10. More precisely, the second sealing element 305 is axial sealing element, for example an O-ring seal 305 configured to be compressed between the second moving element 304 and the valve opening 10 for making a leak tight seal of the valve opening 10.

As shown in the FIGS. 5, 6 and 7, the second moving element 304 comprises a central hole 308 having a frusto-conical surface. The first moving element 306 has a frusto-conical shape and the outer surface of the first moving element 306 forms the first sealing means 309 which has a complementary frustoconical surface configured to cooperate with the frustoconical surface of the central hole 308 of the second moving element 304 to make a leak tight seal of the valve opening 10 when the O-ring seal 305 is compressed.

The first moving element 306 is fixed axially and radially to the motor shaft 303 to move together with the motor shaft 306. The second moving element 304 is mounted movable on the same motor shaft 303, such that it can take at least two positions relative to the motor shaft 303. To this end, the motor shaft 303 comprises an abutment 310 configured to cooperate with the second moving element 304 such that the second moving element 304, once in contact with the abutment 310, moves together with the motor shaft 303. The first moving element 306 and the second 304 moving elements are disposed coaxially on the axis (A).

The valve 1 comprises a biasing means 307 which can be a compression spring 307 in the described embodiment. The compression spring 307 is arranged between a stationary wall of the valve 1 and the second moving element 304 to provide axial force on the second moving element 304 to ensure the second sealing means 305 remains sealed during the movement of the first moving element 306.

FIG. 5 illustrates a fully retracted position of the actuator shaft, corresponding here to a fully closed position of the valve, wherein the valve opening 10 is closed by both of the first moving element 306 and the second moving element 304. The second moving element 304 is maintained on a closed position by the force of the compression spring 307. The first moving element 306 is also on a closed position because the motor shaft 303 is on its lowest position.

FIG. 6 illustrates an opened position of the first moving element 306 wherein the first moving element 306 has moved together with the motor shaft 303 axially to allow a first flow between the fuel tank and the canister, through a first passageway 20 with a first size. The first passageway 20 is defined by the central hole 308 of the second moving element 304. The second moving element 304 is still maintained on a closed position by the force of the compression spring 307.

FIG. 7 illustrates an opened position of the second moving element 304 wherein the second moving element 306 is in contact with the abutment 310 on the motor shaft 303 which moves the second moving element 306 together with the motor shaft 303 axially to allow a second flow between the fuel tank and the canister, through a second passageway 30 with a second size, bigger than the first size. The second passageway 30 is defined by the space between the second sealing means 305 and the valve opening 10.

FIG. 8 is a diagram illustrating the flow curve relative to the percentage of valve opening which is directly related to the axial movement of the poppet, in a fluid controlling system according to respectively a first known prior art, a second known prior art and the invention. The curve a) represents the first known fluid controlling system, the curve b) represents the second known fluid controlling system and the curve c) represents the fluid controlling system according to the invention. In the illustrated example, the first 2% of the full opening corresponds to the beginning of the opening of the first passageway. It is clear that within this percentage opening, the invention (curve c) allows to obtain a smaller change of flow than the second known fluid controlling system (curve b) which means that the flow is better controlled and a better resolution of flow control is obtained whereas the first known fluid controlling system (curve a) does not allow any flow. Moreover, the fluid controlling system according to the invention offers a flow resolution which is more stable which means that when the valves continues to move to its full opened position, the flow increases constantly (in this example, until 13% of the full opening), while in the case of the second known fluid controlling system (curve b) the change of flow stagnates between 2% and 7% of the full opening which corresponds to the end of the opening of the first passageway.

Figure 9:
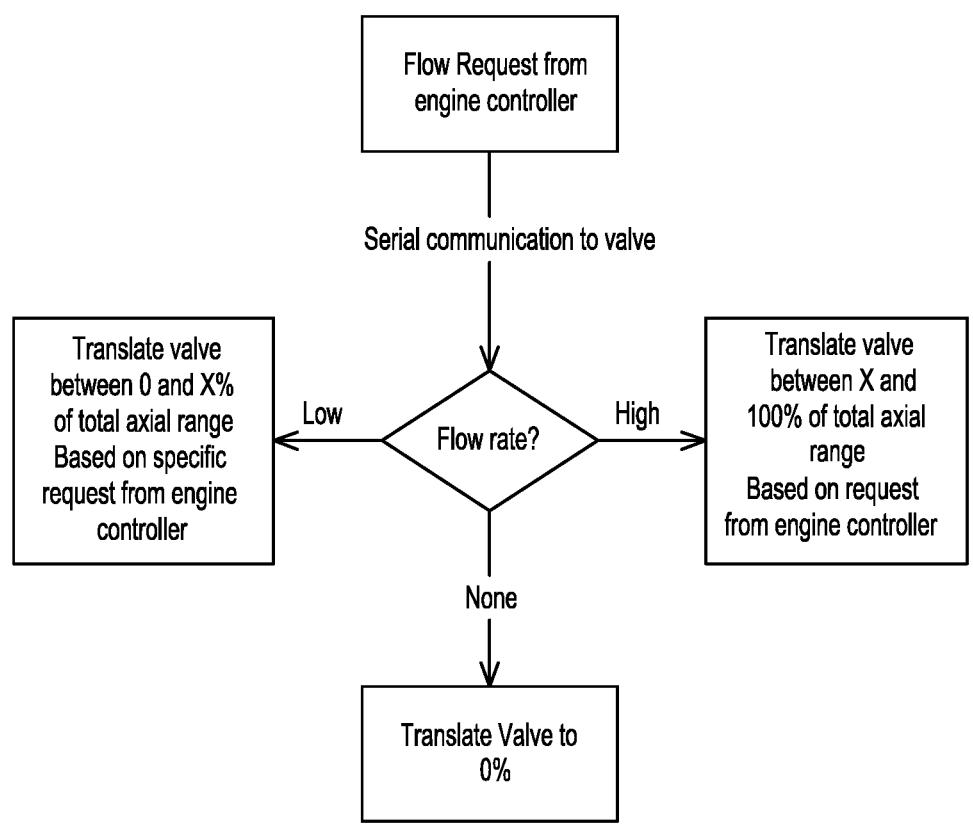
FIG. 9 is a diagram illustrating a method of controlling a valve according to the invention.

FIG. 9 is a diagram illustrating a method of controlling a valve according to the invention. According to this method, a flow request from an engine controller via a serial communication is received. If a low rate of flow is requested, the actuator is translated within a non-zero first axial travel range in order to move the first moving element relative to the second moving element; if a high rate of flow is requested, the actuator is translated within a non-zero second axial travel range which is bigger than the first axial travel range, in order to move both the first moving element and the second moving element; if none flow is requested, the actuator is kept on a position wherein the valve is sealed shut.

FIG. 10a-10d illustrate geometrically the cross section of the flow area when the sealing surface is moved away from the central hole. In FIG. 10a, the angle between the axis (A) and the sealing surface is 0° and the central hole 11 is parallel to the second moving element 12, resulting in no change—in flow area between the two—proportional to vertical movement of one within the other. The angle between the axis (A) and the sealing surface is 30° in FIG. 10b and 45° in FIG. 10c, the respective central holes 13,15 are frustoconical as are the corresponding second moving elements 14 and 16, therefore flow area due to vertical movement of the second moving element relative to the central hole is proportional to the resulting distance between the two times the circumference of the minimum opening diameter. In FIG. 10d which represents the first known fluid control system, the angle between axis (A) and sealing surface is 90° and the movement of the second moving element 17 is directly related to its vertical movement relative to the central hole 18 resulting in a larger gain in flow per unit of vertical movement than FIG. 10b or 10c, this making it more difficult to precisely control the flow.

FIG. 11 represents the flow area as a function of the opening height in millimetres. In relation to FIG. 10a-10d, it can be seen that line 22 stays at zero regardless of the opening height. In lines 23 and 24, the relationship of flow area to opening height are correspondent to the FIGS. 10b and 10c. Finally, in line 25 representing the prior art relating to FIG. 10d, the relationship between opening height and flow area can be seen to be the strongest or, in other words, offering the most increase in flow area per millimetre of opening.

The invention is not limited to the illustrated embodiment, especially in the second embodiment, the inner O-ring seal 408 can be fixed to the first moving element 404 and configured to cooperate with the second moving element 405 to make a leak tight seal.

The invention claimed is:

1. A valve for controlling a pressure differential by regulating the fluid flow between a fuel tank and a canister, comprising:
   a valve opening,
   a first moving element carrying a first sealing means for making a leak tight seal, the first moving element being movable relative to the valve opening between a closed position and an opened position allowing a first flow between the fuel tank and the canister, through a first passageway with a first size,
   a second moving element, distinct from the first moving element, carrying a second sealing means for making a leak tight seal, the second moving element being movable relative to the valve opening between a closed position and an opened position allowing a second flow between the fuel tank and the canister, through a second passageway with a second size, different from the first size,
   the first and second moving elements being configured to be actuated by a common actuator, wherein:
   the second moving element comprises a central through hole having a frustoconical surface which narrows in direction of the valve opening, partly defines the first passageway and through which the common actuator is displaceable, and
   the first sealing means, received in the central through hole of the second moving element, has a complementary frustoconical surface configured to cooperate with the frustoconical surface of the central hole of the second moving element to make a leak tight seal.

2. The valve according to claim 1, wherein the actuator comprises a shaft having an axis and the first and second moving elements are disposed coaxially on the axis.

3. The valve according to claim 1, wherein
   the first moving element is mounted permanently fixed to the actuator, and
   the second moving element is mounted movable on the actuator, such that it can take at least two positions relative to the actuator.

4. The valve according to claim 3, wherein the actuator comprises an abutment configured to cooperate with the second moving element such that the second moving element, once in contact with the abutment, moves together with the actuator.

5. The valve according to claim 1, comprising a biasing means configured to provide axial force on the second moving element to ensure the second sealing means remains sealed during the movement of the first moving element.

6. The valve according to claim 1, wherein the second moving element at least partly defines both the first passageway and the second passageway.

7. The valve according to claim 6, wherein the second moving element comprises a through-hole at least partly defining the first passageway when the first moving element is in the opened position, and the second sealing means cooperates with the valve opening to define the second passageway when the second moving element is on the opened position.

8. The valve according to claim 1, wherein a biasing means is arranged between a stationary wall of the valve and the second moving element.

9. A fuel system comprising a fuel tank, a filler pipe for adding liquid fuel, a carbon canister for collecting fuel vapours from the fuel tank during a refuelling operation and a valve according to claim 1.

10. A vehicle comprising a fuel system according to claim 9.

11. A method of controlling a valve according to claim 1 comprising the following steps:
- receiving a flow request from an engine controller via a serial communication,
- if a low rate of flow is requested, translating the actuator within a non-zero first axial travel range in order to move the first moving element relative to the second moving element,
- if a high rate of flow is requested, translating the actuator within a non-zero second axial travel range which is bigger than the first axial travel range, in order to move both the first moving element and the second moving element
- if none flow is requested, keeping the actuator on a position wherein the valve is sealed shut.

* * * * *